Aug. 13, 1929.　　　　C. W. OTT　　　　1,724,409
POWER LAWN MOWER
Filed Feb. 16, 1925　　　4 Sheets-Sheet 1

INVENTOR
C.W.OTT
BY Munn & Co
ATTORNEYS

Aug. 13, 1929.  C. W. OTT  1,724,409
POWER LAWN MOWER
Filed Feb. 16, 1925  4 Sheets-Sheet 2

INVENTOR
C. W. OTT
BY
ATTORNEYS

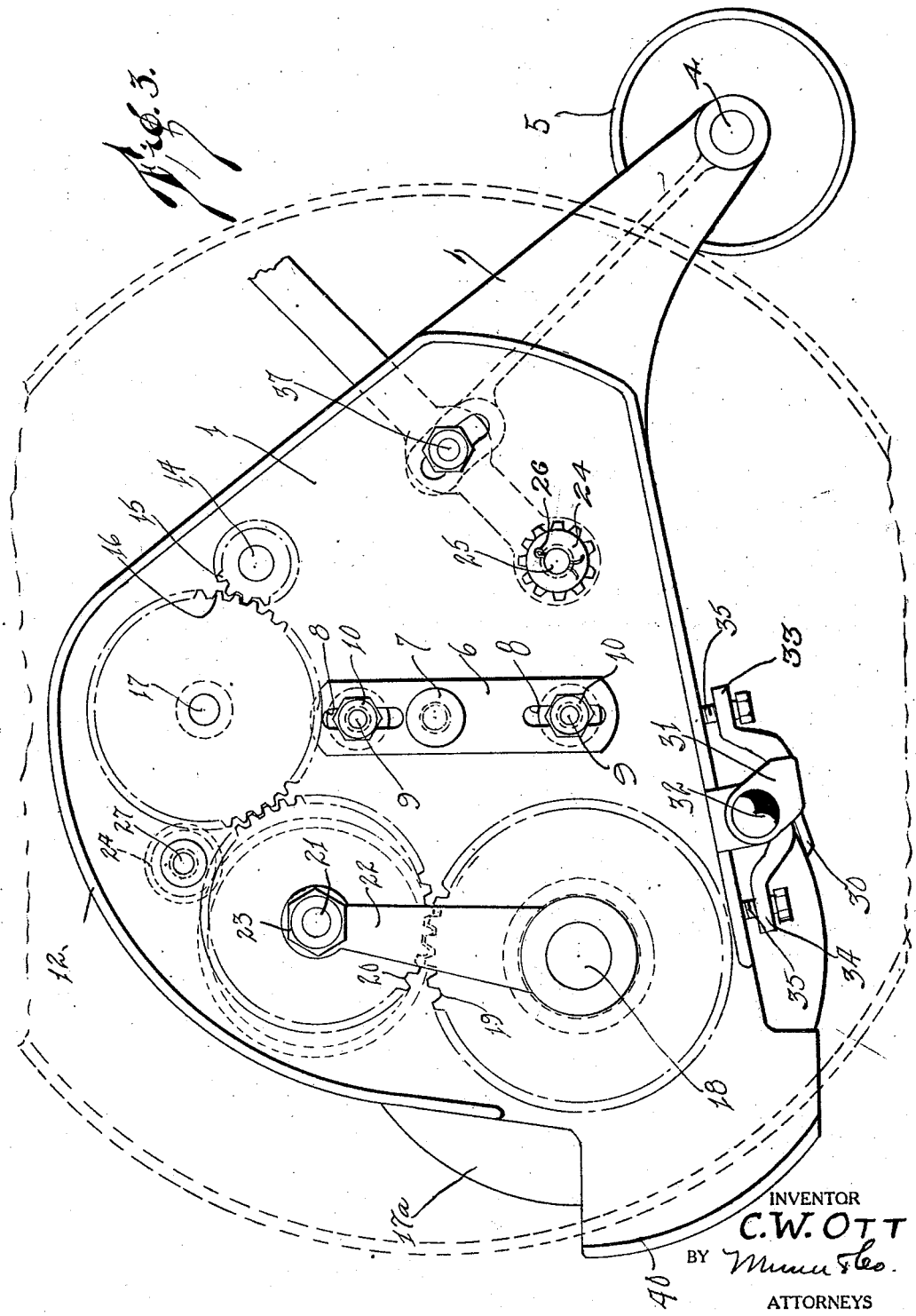

Aug. 13, 1929.　　　C. W. OTT　　　1,724,409
POWER LAWN MOWER
Filed Feb. 16, 1925　　　4 Sheets-Sheet 4
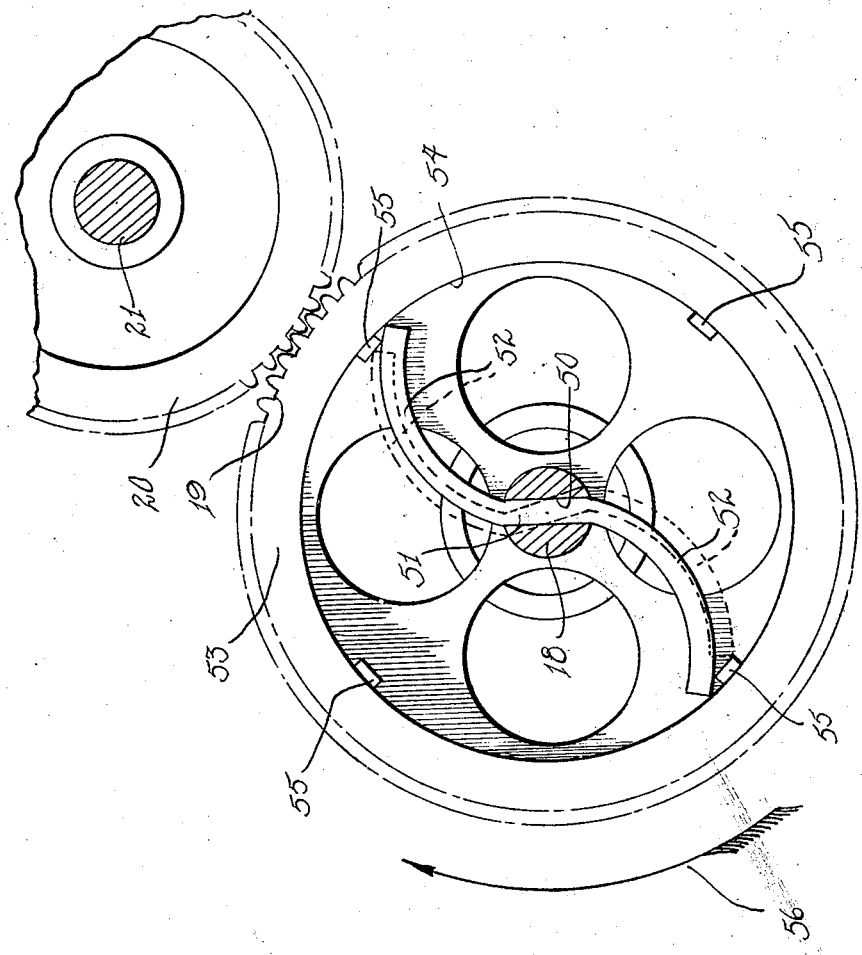
INVENTOR
C. W. OTT
BY
ATTORNEYS Patented Aug. 13, 1929.

1,724,409

UNITED STATES PATENT OFFICE.

CHARLES WALTER OTT, OF PITTSBURG, KANSAS.

POWER LAWN MOWER.

Application filed February 16, 1925. Serial No. 9,562.

My invention relates to improvements in power lawn mowers, and it consists in the combinations, constructions, and arrangements herein described and claimed.

An object of my invention is to provide a power lawn mower of the character described, which is intended to be manually moved over a lawn or the like, and which derives its power from the ordinary house lighting power source.

A further object of my invention is to provide a power lawn mower of the character described, in which a novel arrangement of the cutter blades permits cutting of the grass to a point relatively close to the foremost portion of the mower, and therefore, which is especially desirable for trimming lawns adjacent to walls, trees and the like.

A further object of my invention is to provide a power lawn mower of the character described, in which novel means is provided for preventing twigs, bits of grass and the like from moving into the driving mechanism of the mower.

A further object of my invention is to provide a power lawn mower of the character described, in which a combination guide and guard member is employed for guiding the uncut grass toward the cutter blades as the mower is moved forwardly.

A further object of my invention is to provide a power lawn mower of the character described, which is simple in construction, which is durable, and which may be easily moved from place to place.

Other objects and advantages will appear in the following specification, and the novel features of the invention will be particularly pointed out in the appended claims.

Figure 1:
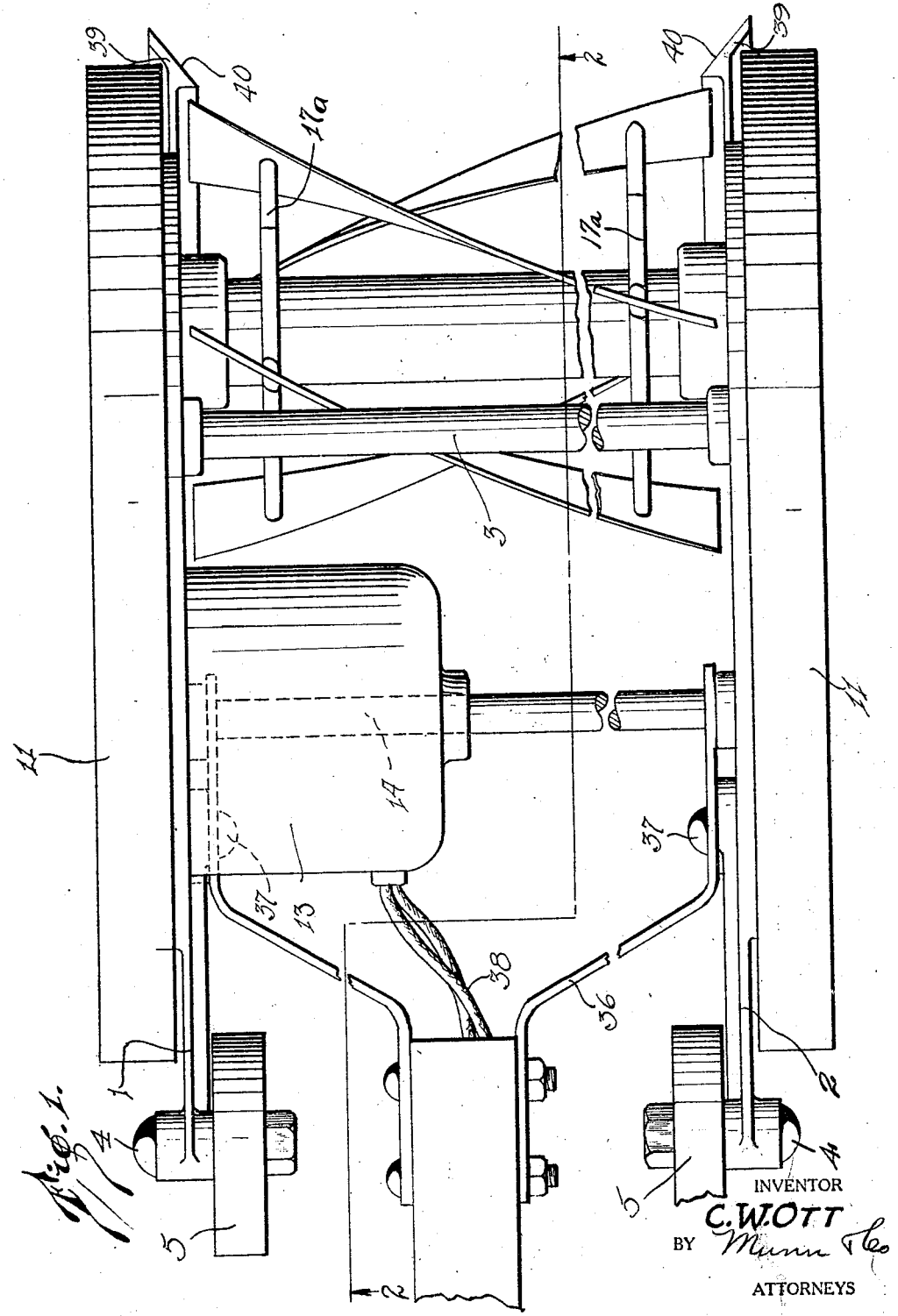
Figure 2:
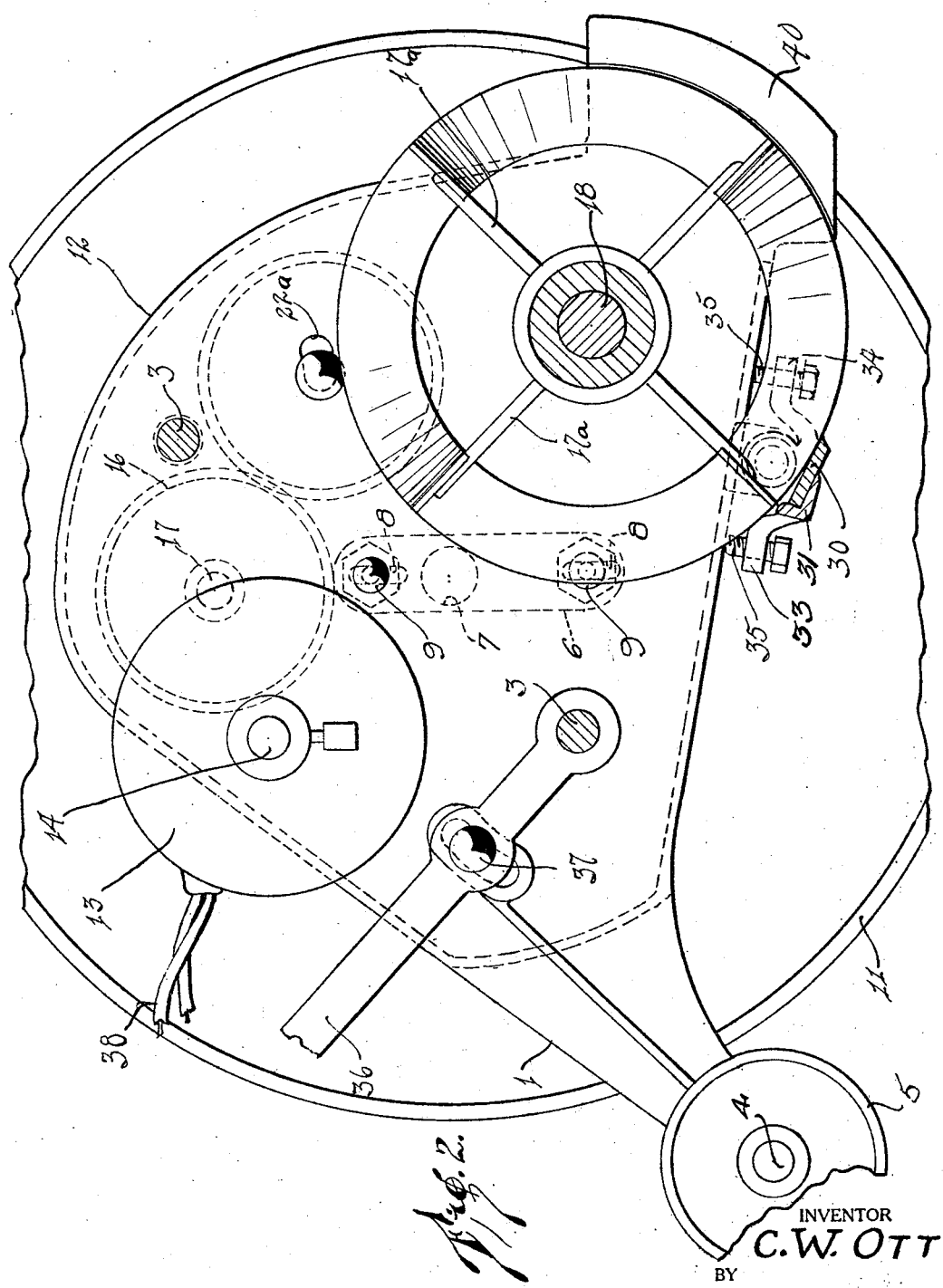

My invention is illustrated in the accompanying drawings forming part of this application, in which Figure 1 is a top plan view of an embodiment of my invention, Figure 2 is an enlarged sectional view along the line 2—2 of Figure 1, Figure 3 is an enlarged side elevation of the mechanism illustrated in Figure 1 with a wheel removed, and Figure 4 is an enlarged sectional view of a portion of the device including the overload mechanism.

In carrying out my invention I make use of a carriage consisting of a pair of vertically spaced apart frame members, 1 and 2, which are identical in profile. Horizontally extending braces 3 are employed for maintaining the frame members 1 and 2 in spaced relation to one another to form the carriage. A stub axle 4 is mounted at the rear portion of each frame 1 and 2, respectively, and is parallel with the brace members 3. A pair of roller wheels 5 are rotatably mounted upon the axes 4 one adjacent to each of the frame members 1 and 2.

A pair of vertically adjustable bearing support members 6 are provided for each of the frame members 1 and 2. These members 6 have bearing portions 7 formed integral therewith, and are each provided with vertically extending slots 8, one on each side of the bearing member 7. Bolts 9 are projected through the wall of the frame members 1 and 2, respectively, and through the slots 8 of the adjustable members 6. Binding nuts 10 are employed in connection with the bolts 9 for the purpose of securing the members 6 in adjusted position vertically, relative to their respective frame members 1 and 2.

A relatively large tractor wheel 11 is rotatably mounted in the bearing members 7 of each of the members 6. Thus the carriage may be moved from place to place upon its tractor wheels 11 and roller 5.

The wheels 11 each have inwardly extending peripheral flanges which give a relatively large traction surface to the wheels, and which provides a semi-encased space between the frames 1 and 2 and the respective side walls of the wheels.

The frames 1 and 2 are provided with outwardly extending perimetrical flanges 12 which extend toward the adjacent walls of the wheels 11.

An electric motor 13 is mounted upon the frame 1 by any suitable means, and its shaft 14 is projected through the wall of the frame member. A pinion 15 is carried by that portion of the shaft 14 on the outer side of the wall of the frame 1.

A gear 16 is rotatably mounted upon a stub shaft 17 extending outwardly from the outer wall of the frame member 1. The gear 16 is in mesh with the pinion 15.

A rotary cutter blade 17ᵃ is carried by a shaft 18, rotatably mounted at its opposite ends upon the frame members 1 and 2, respectively. That end of the shaft 18 adjacent to the frame bearing the gear 16 and the pinion 15 and upon which the electric motor 13 is mounted is provided with a transverse opening 50 therethrough. A band spring 51 is projected through the opening 50 and secured thereto. The outer ends 52 of the band spring 51 are curved as shown in Figure 4 toward the direction of rotation of the cutter blade 17ª.

A gear 19 is rotatably mounted upon the shaft 18 closely adjacent to the spring 51 a portion of the gear 53 overhanging the spring 51 and with its inner wall 54 in engagement with the extremities of the spring. The inner wall 54 has inwardly extending radial projections 55 whereby rotation of the gear 19 in the direction of the arrow 56 will cause the shaft 18 to be yieldingly driven and thus drive the rotary cutter blade. This particular construction I shall refer to hereinafter as an overload mechanism by means of which no damage is done to the gears or motor, if small particles of twigs, stones or the like become lodged between the cutter blades of the mower. The gear 19 is in mesh with a gear 20, which is rotatably mounted upon a shaft 21 projected through an elongated slot 22ª and the frame member 1 at one end and through an arm 22 pivotally mounted upon the shaft 18 at its opposite end. Thus the gear 20 may be moved edgewise into and out of mesh with the gear 16 at will. A binding nut 23 disposed upon the outer end of the shaft 21, which is threaded for such purpose, serves to lock the shaft 21 in its adjusted position, relative to the gear 16 at will.

A pinion 24 is normally carried upon a shaft portion 25 formed of that portion of the brace 3, which is projected through the wall of the member 1. This pinion is held in place by a cotter pin 26, or other readily actuated rocking means.

A stub shaft portion 27 similar to the portion 25 is formed of that portion of the brace 3 projected through the frame member 1 adjacent to the upper end of the frame. Thus the pinion 24 may be placed upon the shaft portion 27, when the gears 20 and 16 are apart, so as to establish a gear train between the pinion 15 and the gear 19, which will cause rotation of the gear 19 in a direction opposite to that direction which the gear will move when the pinion 24 is disengaged and the gears 16 and 20 are permitted to mesh with one another.

An adjustable stationary cutter blade 30 is supported at each end by means of mounting members 31 pivotally supported to the frames 1 and 2, respectively, as shown at 32. These mounting members 31 have diametrically opposed radial arm members 33 and 34 respectively, one at each end thereof, each of which has a threaded adjustment screw 35 projected therethrough, which is arranged to engage with the frame members 1 and 2 respectively. By this means, the cutter blade 30 may be moved into proper engagement with the movable or rotary cutter blade 17ª, by actuation of the adjustment screw 35.

A handle member 36 is pivotally supported to the frame members 1 and 2, respectively, by means of the brace member 3. An adjustment screw 37 is employed in connection with the handle member 36 which provides adequate means for adjustment of the inclination of the handle.

The lead wires 38 of the motor 13 are secured in any well known manner to the handle adjacent its upper end, and from there to suitable outlet receptacles disposed wherever convenient.

Upon an inspection of Figure 1, it will be noted that frame members 1 and 2 are each provided with combination guide and guard members 39 which have surfaces 40 for contacting with and guiding grass and the like into the cutter blades, and preventing the engagement of the grass with the ends of the cutter blades where it might become entangled with the shaft and bearing members of the cutter blades.

The members 39 partially overhang the flanged part of the wheels 11 and thus prevent the movement of the twigs, grass and the like between the wheels and the frames 1 and 2.

From the foregoing description of the various parts of the device, the operation thereof may be readily understood. I prefer to employ a relatively long electrical conducting cable, such as any of the well known flexible cables, for connecting my improved power mower with a source of current supply. This cable may be wound upon a reel when not in use. When the current is turned on, the motor 13 will operate thereby driving the gear 16 through the pinion 15 carried by the motor shaft. When the gear 20 is in the position shown in Figure 3, which is the normal operating position, the gear 16, will drive that gear, which in turn will drive the gear 19 and rotate the cutter blade 17ª.

The mower may then be moved across a lawn or the like and cut the grass between its cooperating cutter blades 17ª—30. As stated heretofore, the blade 17ª is disposed at the foremost end of the motor, and therefore, grass may be cut relatively close to a wall or the like, which is an important advantage over the ordinary type of mower.

The guide member 39 will cause the upstanding, uncut grass to bend slightly where it contacts the grass, so as to assure engagement of as much of uncut grass as possible with the cutter blades, and also to prevent entanglement of the grass, twigs and the like between the ends of the cutter blades 17ª and the frames 1 and 2.

Twigs, cut grass and the like are prevented from falling behind the wheels 11 by virtue of the guard member which consists of that portion of the member 39 overhanging the wheels 11.

It will be noted that speed of the rotary cutting blade 17ª is constant, while movement of the mower across the grass is determined entirely by the will of the operator, who pushes the mower manually. Thus portions of the lawn may be given more careful attention, particularly where the grass is thick, by slowly moving the mower thereover, so as to insure complete cutting.

Let us now assume that it is desired to sharpen the blade 17ª. This is done by placing an abrasive material upon the cutter blade 30. The next step is that of loosening the nut 23 and moving the gear 20 out of mesh with the gear 16, whereupon the nut is again tightened. The pinion 24 is then removed from its stub shaft 25 and placed upon the stub shaft 27, thus establishing driving connection in reverse direction between the gears 16 and 20. Operation of the motor 13 will then drive the cutter blades 17 in a reverse direction, as in sharpening the blade.

It will be noted that one of the most important advantages of my power driven lawn mower is that grass may be cut up to within an exceptionally short distance from a fence or the like. In the ordinary device this distance should not exceed one inch or the width of the wheels 11 plus the distance from the inner edge of the wheel to the outer extremity of the cutting blade 17ª. This feature is one of great importance, since with the ordinary type of lawn mower considerable distance must necessarily lie between the cutting blades and the outer portion of the wheel due to the construction heretofore carried out.

It will be noted that sufficient clearance is permitted between the inner wall of the flanges of the wheels 11 and the adjustable cutting blade to permit extensive adjustment of the wheels relative to the frames by the provision of the sliding bearing plates 6.

Let us assume that an obstacle has become lodged between the rotary cutting blade and the stationary cutting blade while the motor is in use. As quickly as this occurs the shaft 18 will be stopped in its rotation and continued movement of the gear 19 by virtue of the motor will cause the spring 51 to yield so as to permit the projections 55 which normally drive the shaft through the spring to pass over the flexed spring, and thus relieve the moving parts of unnecessary strain.

I claim:

1. A power driven lawn mower of the character described, comprising a pair of frame members, an electric motor carried by said frame members, a shaft rotatably mounted at its opposite ends upon said frame members, a spring fixed to one end of said shaft, a rotary blade secured to said shaft, a ring gear rotatably mounted upon said shaft, said ring gear having a laterally extending flange on that face adjacent one of said frame members, said flange having inwardly extending radial projections for engaging with said spring, and means for operatively connecting said ring gear with said motor.

2. A power driven lawn mower of the character described, comprising a pair of disk wheels having inwardly extending flanges, a carriage disposed between said wheels, said carriage having a flat face on each end thereof and parallel to said wheels, each of said faces having an outwardly extending flange adjacent to said disk wheels and disposed within said first named flanges, a yielding gear train disposed within the spaces confined by the flanges on said wheels and on said carriage, a motor in operative engagement with said yielding gear train, a rotary blade, and means for operatively connecting said yielding gear train with said rotary blade.

3. A power driven lawn mower of the character described comprising a carriage, a pair of wheels arranged for manual movement across a lawn, pivots carried by the wheels for pivotally mounting said carriage, a motor, a stationary cutting blade, a rotary cutting blade, said first and second named blades being mounted near the front of said carriage and said wheels, a yielding gear train between said motor and said rotary blade, and a handle for guiding said carriage, and for tilting it on its pivots.

4. A power driven lawn mower of the character described comprising a pair of disc wheels having inwardly extending flanges, a carriage pivotally carried between said wheels, pivots carried by the wheels for pivotally mounting said carriage, said carriage having a flat face on each end thereof and parallel to said wheels, each of said faces having an outwardly extending flange adjacent to said disc wheels and disposed within said first named flanges, a stationary cutting blade, a rotary cutting blade, said first and second named cutting blades being mounted near the front of said carriage and said wheels, a yielding gear train disposed within the spaces confined by the flanges on said wheels and on said carriage, a motor in operative engagement with said yielding gear train, means for operatively connecting said yielding gear train with said rotary blade, and a handle for guiding said carriage, and for tilting it on its pivots.

5. A power driven lawn mower comprising a pair of disc wheels having flanges, a pair of frame members, an electric motor carried by said frame members, a shaft rotatably mounted at its opposite ends upon said frame members, a spring fixed to one end of said shaft, a rotary blade secured to said shaft, a ring gear rotatably mounted upon said shaft, said ring gear having a laterally extending flange on that face adjacent one of said frame members, said flange having inwardly extending radial projections for engaging said spring, means for operatively connecting said ring gear with said motor, and a flange integral with one of said frame members and disposed within the flange on one of said disc wheels, the flange on said frame member being arranged to enclose said means and said ring gear.

CHARLES WALTER OTT.